(12) United States Patent
Ono

(10) Patent No.: US 11,845,591 B2
(45) Date of Patent: Dec. 19, 2023

(54) POURING SPOUT

(71) Applicant: FUJIMORI KOGYO CO., LTD., Bunkyo-ku (JP)

(72) Inventor: Matsutaro Ono, Shinjuku-ku (JP)

(73) Assignee: FUJIMORI KOGYO CO., LTD., Bunkyo-ku (JP)

( * ) Notice: Subject to any disclaimer, the term of this patent is extended or adjusted under 35 U.S.C. 154(b) by 441 days.

(21) Appl. No.: 17/289,911

(22) PCT Filed: Oct. 24, 2019

(86) PCT No.: PCT/JP2019/041727
§ 371 (c)(1),
(2) Date: Apr. 29, 2021

(87) PCT Pub. No.: WO2020/090619
PCT Pub. Date: May 7, 2020

(65) Prior Publication Data
US 2022/0002038 A1 Jan. 6, 2022

(30) Foreign Application Priority Data
Oct. 30, 2018 (JP) .................. 2018-203811

(51) Int. Cl.
*B65D 47/08* (2006.01)
*B65D 75/00* (2006.01)
*B65D 75/58* (2006.01)

(52) U.S. Cl.
CPC ....... *B65D 47/0885* (2013.01); *B65D 75/008* (2013.01); *B65D 75/5883* (2013.01); *B65D 2575/586* (2013.01)

(58) Field of Classification Search
CPC .. B65D 47/06; B65D 47/248; B65D 47/2068; B65D 47/08; B65D 47/243;
(Continued)

(56) References Cited

U.S. PATENT DOCUMENTS 1,672,983 A * 6/1928 Mapel ................... B65D 47/16
141/308
5,533,553 A * 7/1996 Vesborg ............... B65D 1/0223
141/366
(Continued)

FOREIGN PATENT DOCUMENTS

JP 11-143204 A 5/1999
WO WO 2018/173382 A1 9/2018

OTHER PUBLICATIONS

Extended European Search Report dated Jul. 8, 2022 in European Patent Application No. 19879274.9, 8 pages.

*Primary Examiner* — Charles P. Cheyney
(74) *Attorney, Agent, or Firm* — Oblon, McClelland, Maier & Neustadt, L.L.P.

(57) ABSTRACT

To provide a pouring spout in which an open state of the closing member is maintained while contents are being transferred. The above-described problem is solved by a pouring spout (10) including a spout main body (10A) and a closing unit (20). The spout main body (10A) includes at least a bonded part (15), a tubular part (11), and a channel (18). The closing unit (20) includes a closing member (21), an attaching part (24), and a coupling member (23). The spout main body (10A) is formed with an attached part (40). The coupling member (23) couples a first surface of the closing member (21) on the attaching part (24) side and facing the pouch main body part side, and the attaching member (24). The closing member (21) includes a fixed region corresponding to an area of a second surface opposite to the first surface on the attaching part (24) side thereof in which the coupling member (23) is coupled, the fixed region being supported by a nozzle (58) of a packaging container, thereby holding an angle θ formed by the closing member (21) with an end surface of the bonded part (15) on the pouch main body part side at less than 90 degrees.

4 Claims, 9 Drawing Sheets

(58) Field of Classification Search
CPC .......... B65D 47/0885; B65D 2575/586; B65D 75/008; B65D 75/5883; B67D 7/005
USPC .................. 222/162, 499, 501, 514, 566
See application file for complete search history.

(56) References Cited

U.S. PATENT DOCUMENTS

| | | | | |
|---|---|---|---|---|
| 6,126,045 | A * | 10/2000 | Last | B65D 41/02 222/499 |
| 8,118,066 | B2 * | 2/2012 | Muhlhausen | B67B 7/28 141/330 |
| 10,961,025 | B2 * | 3/2021 | Ono | B65D 47/08 |
| 11,155,390 | B2 * | 10/2021 | Ono | B05C 17/00513 |
| 11,518,597 | B2 * | 12/2022 | Bloedt | B65D 75/008 |
| 2009/0200342 | A1 * | 8/2009 | Albaum | B65D 47/0885 222/162 |
| 2012/0024858 | A1 * | 2/2012 | Sholes | B65D 75/5883 220/367.1 |
| 2012/0216918 | A1 * | 8/2012 | Tsuda | B65D 21/086 215/370 |
| 2013/0319970 | A1 * | 12/2013 | Sugawara | B65D 47/10 215/373 |
| 2018/0339818 | A1 * | 11/2018 | Matsumoto | B67D 7/005 |
| 2020/0023391 | A1 * | 1/2020 | Cesare | B65D 75/5883 |
| 2020/0095033 | A1 | 3/2020 | Ono | |

* cited by examiner

POURING SPOUT

CROSS REFERENCE TO RELATED APPLICATIONS

This application is a National Stage of International Application No. PCT/JP2019/041727, filed Oct. 24, 2019, and claims priority to Japanese Application No. 2018-203811, filed Oct. 30, 2018. The entire disclosures of all of the above applications are incorporated herein by reference.

FIELD OF THE INVENTION

The present invention relates to a pouring spout, and more specifically to a pouring spout constituting a refill container storing contents to pour the contents into a predetermined packaging container.

BACKGROUND ART

Packaging containers include containers utilized repeatedly by pouring contents from a refill container separately provided into the packaging container. The refill container includes a pouch main body part and a pouring spout attached to this pouch main body part. The pouring spout is a constituting part that pours the contents from the pouch main body part into the packaging container. The present applicant has proposed various pouring spouts described above that constitute a refill container.

The pouring spout proposed in Patent Document 1 is a pouring spout proposed by the present applicant. This pouring spout includes a closing member that allows a channel for pouring out the contents from the pouring spout to be opened and closed. Specifically, in this pouring spout, a main body of the pouring spout and a constituent for closing the channel are integrally formed. The constituent for closing is provided on one end side forming an outer side of the channel, and the channel is opened and closed on the one end side. The closing member, in a mode of removal from the channel by an external force applied from a pouch main body side, is fit horizontally onto an inner peripheral surface of the channel on the one end side thereof. The closing member is connected to the pouring spout by a coupling member having a string or belt shape.

PRIOR ART DOCUMENTS

Patent Documents

Patent Document 1: U.S. Pat. No. 6,236,139

SUMMARY OF THE INVENTION

Problems to be Solved by the Invention

The present applicant has been diligently researching pouring spouts even after proposing the pouring spout described in Patent Document 1 mentioned above. The result was an invention of a pouring spout constituted by a spout main body bonded to a pouch main body part constituting a refill container, and a closing unit that is constituted as a separate body from the spout main body and opens and closes a channel formed in the spout main body. The closing unit is constituted by a closing member that opens and closes the channel, an attaching part that detachably attaches the closing unit to the spout main body, and a coupling member that connects the closing member and attaching part. In such a pouring spout, it is necessary for the closing member to be maintained in an open state without closing the channel while the contents are being transferred from the refill container to the packaging container.

The present invention was made to resolve the above-described problems, and an object of the present invention is to provide a pouring spout in which a closing member is maintained in an open state while contents are being transferred.

Means for Solving the Problems

A pouring spout according to the present invention for solving the above-described problems is a pouring spout provided to a refill container, and for pouring out contents stored in the refill container into a packaging container. The pouring spout comprises a spout main body and a closing unit, the spout main body including at least a bonded part bonded to a pouch main body part constituting the refill container, a tubular part for pouring out the contents, and a channel for passing the contents from an inside to an outside of the refill container, and the closing unit including a closing member that freely opens and closes the channel, an attaching part that detachably attaches the closing unit to the spout main body, and a coupling member that connects the closing member and the attaching part. The spout main body is formed with an attached part to which the attaching part is detachably attached. The packaging container includes a container main body and a pouring unit for pouring out the contents stored in the container main body. The pouring unit includes at least a nozzle for pouring out the contents. The coupling member couples a first surface of the closing member on the attaching part side and facing the pouch main body side in a mode of the closing member having closed the channel, and the attaching member. The closing member includes a fixed region corresponding to an area of a second surface opposite to the first surface on the attaching part side thereof in which the coupling member is coupled to the closing member, the fixed region being supported by the nozzle, thereby holding an angle formed by the closing member with an end surface of the bonded part on the pouch main body part side at less than 90 degrees.

According to this invention, in the pouring spout having the configuration mentioned above, the closing member includes the fixed region corresponding to an area of the second surface of the closing member on the attaching part side opposite to the first surface and corresponding to the area where the coupling member is coupled to the closing member, the fixed region being supported by the nozzle, thereby holding the closing member in a mode in which an angle formed by the closing member with the end surface of the bonded part on the pouch main body part side is less than 90 degree. The closing member is held by the nozzle, and thus maintained in an open state while the contents are being transferred.

In the pouring spout according to the present invention, in a mode of the closing member being pressed upward by the nozzle and having opened the channel, the coupling member is formed at a length within a range allowing the second surface to be brought into contact with an outer peripheral surface of the nozzle.

According to this invention, the coupling member is formed at a length within a range in which the second surface can be brought into contact with the outer peripheral surface of the nozzle and thus, in the mode of the closing member having opened the channel, the fixed region of the closing member corresponding to the area where the coupling member is coupled does not move further inward of the pouch main body part than a tip end of the nozzle. Therefore, the closing member reliably comes into contact with the nozzle, and the open mode of the closing member is held by the nozzle.

In the pouring spout according to the present invention, the coupling member is constituted by a first constituting part extending from the coupling member connecting part toward the closing member, and a second constituting part bent with respect to the first constituting part and extending from a tip end of the first constituting part toward the first surface, and has an urging force that urges the closing member toward the nozzle side.

According to this invention, as mentioned above, the coupling member is constituted by the first constituting part and the second constituting part, and the coupling part has an urging force that urges the closing member toward the nozzle side, and thus the closing member in the open mode is in a state of being interposed between the coupling member and the nozzle, and the open mode of the closing member is maintained.

In the pouring spout according to the present invention, the attached part is formed with a coupling member connecting part jutting toward the closing member side, and the coupling member is connected to the coupling member connecting part at one end and connected to the first surface of the closing member at the other end in a longitudinal direction.

According to this invention, the attached part is formed with the coupling member connecting part jutting toward the closing member side, and the coupling member is connected to the coupling member connecting part at one end and connected to the first surface of the closing member at the other end in the longitudinal direction, making it possible for the coupling member connecting part to impart an urging force onto the coupling member. As a result, the coupling member and the nozzle sandwich the closing member, and the closing member can be maintained in the open mode.

Effect of the Invention

According to the present invention, it is possible to provide a pouring spout having a function of maintaining an open state of the closing member while contents are being transferred and promptly closing a channel after the transfer is completed.

EMBODIMENTS OF THE INVENTION

Figure 1:
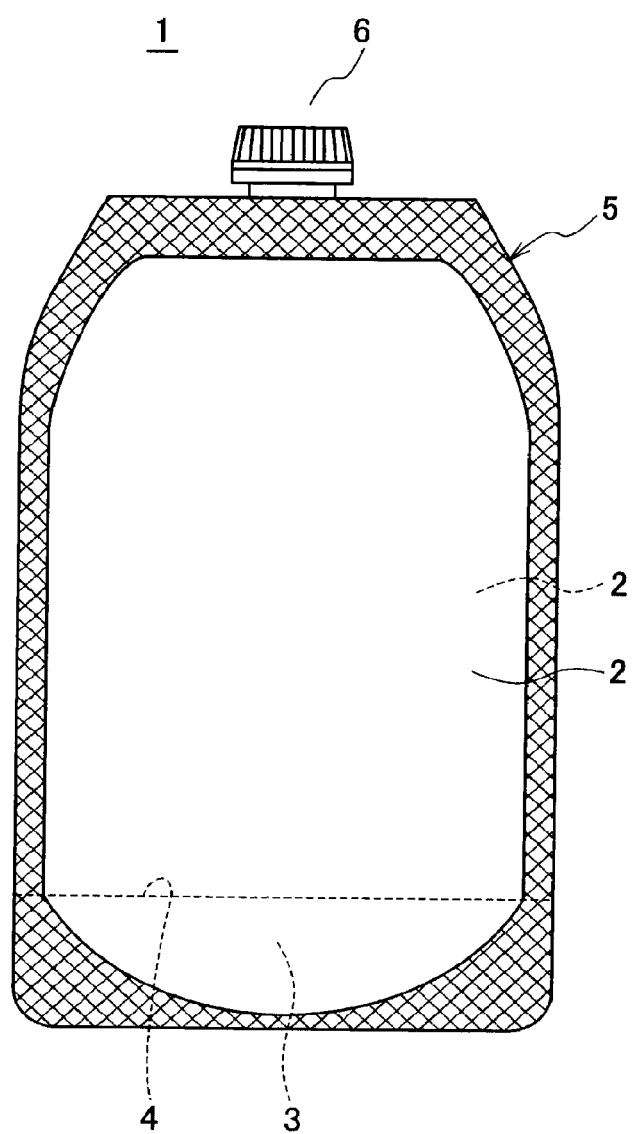
FIG. 1 is a plan view illustrating an example of a refill container that uses a pouring spout according to the present invention.

An embodiment of the present invention is described below with reference to the drawings. The present invention includes inventions of the same technical idea as the modes set forth in the embodiments and drawings described below, and the technical scope of the present invention is not limited to those described in the embodiments and drawings.
[Basic Configuration]

The present invention is a pouring spout 10 provided in a refill container 1 to pour contents stored in the refill container 1. The pouring spout 10 is mainly constituted by a spout main body 10A and a closing unit 20. The spout main body 10A includes at least a bonded part 15, a tubular part 11, and a channel 18. The bonded part 15 is an area bonded to a pouch main body part 5 constituting the refill container 1. The tubular part 11 is a component for pouring the contents. The channel 18 is a component for passing the contents from an inside to an outside of the refill container 1.

The closing unit 20 is a constituent that opens and closes the channel 18. The closing unit 20 is constituted by a closing member 21, an attaching part 24, and a coupling member 23. The closing member 21 freely opens and closes with respect to the channel 18, and is a component for closing and opening the channel 18. The attaching part 24 is a component for detachably attaching the closing unit 20 to the spout main body 10A. The coupling member 23 is a component for connecting the closing member 21 and the attaching part 24, and couples a first surface of the closing member 21 on the attaching part 24 side and facing the pouch main body side in a mode of the closing member 21 having closed the channel 18, and the attaching member. Further, the spout main body 10A is formed with an attached part 40 to which the attaching part 24 is detachably attached.

A packaging container 50 includes a container main body 51 and a pouring unit 55 for pouring the contents stored in the container main body 51, and the pouring unit 55 includes at least a nozzle 58 for pouring the contents. The nozzle 58 supports a fixed region corresponding to an area of a second surface opposite to the first surface on the attaching part 24 side of the closing member 21 in which the coupling member 23 is coupled to the closing member 21. The nozzle 58 thus supports the closing member 21, thereby holding the closing member 21 in a mode in which an angle formed by the closing member 21 with an end surface of the bonded part 15 on the pouch main body part 5 side is less than 90 degrees.

According to the present invention, a characteristic effect is exhibited in which it is possible to provide the pouring spout 10 having a function of maintaining an open state of the closing member 21 while contents are being transferred and promptly closing the channel 18 after the transfer is completed.

The following describes an overview of the refill container 1 that uses the pouring spout 10, an overview of the packaging container 50, a specific configuration of the pouring spout 10, an overview of the packaging container 50 replenished with contents from the refill container 1, and an action of the pouring spout 10.
[Refill Container]

The refill container 1 in which the pouring spout 10 according to the present invention is used is a container for filling and replenishing the packaging container 50 used separately from the refill container 1 with contents. The forms and types of the refill container 1 are not particularly limited. FIG. 1 illustrates a standing pouch serving as an example of the refill container 1. This refill container 1 includes a pair of flat surface parts 2 facing each other, a bottom surface part 3 that closes a bottom portion of the refill container 1, and the pouring spout 10 according to the present invention.

The flat surface parts 2 are sealed together at an upper edge, and sealed together at both side edges. Lower edges of the pair of flat surface parts 2 are each sealed at an edge portion of the bottom surface part 3 facing the lower edge of the flat surface part 2. The bottom surface part 3 is folded in half at a crease 4 at a center thereof, and the crease 4 is folded toward an upper side of the refill container 1. The bottom surface part 3 is configured to allow a bottom portion of the refill container 1 to be unfolded by the unfolding of the bottom surface part 3 from the folded state in directions in which the flat surface parts 2 of the refill container 1 are disposed.

The pouring spout 10 according to the present invention is attached to an upper edge of the refill container 1. The pouring spout 10 is mainly constituted by the spout main body 10A and the closing unit 20. The spout main body 10A includes, as mentioned above, the bonded part 15, the tubular part 11, and the channel 18. Note that, in the embodiment illustrated in FIG. 1, a mode in which the pouring spout 10 is attached to a center of an upper portion of the refill container 1 is given as an example. However, while not particularly illustrated in the drawings, the pouring spout 10 may be provided in a position shifted laterally in a width direction in the upper portion of the refill container 1. Further, the refill container 1 may be provided with an area communicated by an inclined part where an upper edge and a side edge are obliquely inclined, and the pouring spout 10 may be attached to the inclined part.

When the contents are transferred from the refill container 1 into the packaging container 50, a cap 6 that closes the pouring spout 10 is removed, and the refill container 1 is turned upside down. Then, the pouring spout 10 is inserted into the pouring unit 55 of the packaging container 50, and the contents are transferred directly from the refill container 1 into the packaging container 50. Note that this action is described in detail later.

[Pouring Spout]

The pouring spout 10 is composed of two constituting members. One is the spout main body 10A and the other is the closing unit 20.

<Spout Main Body>

Figure 2:
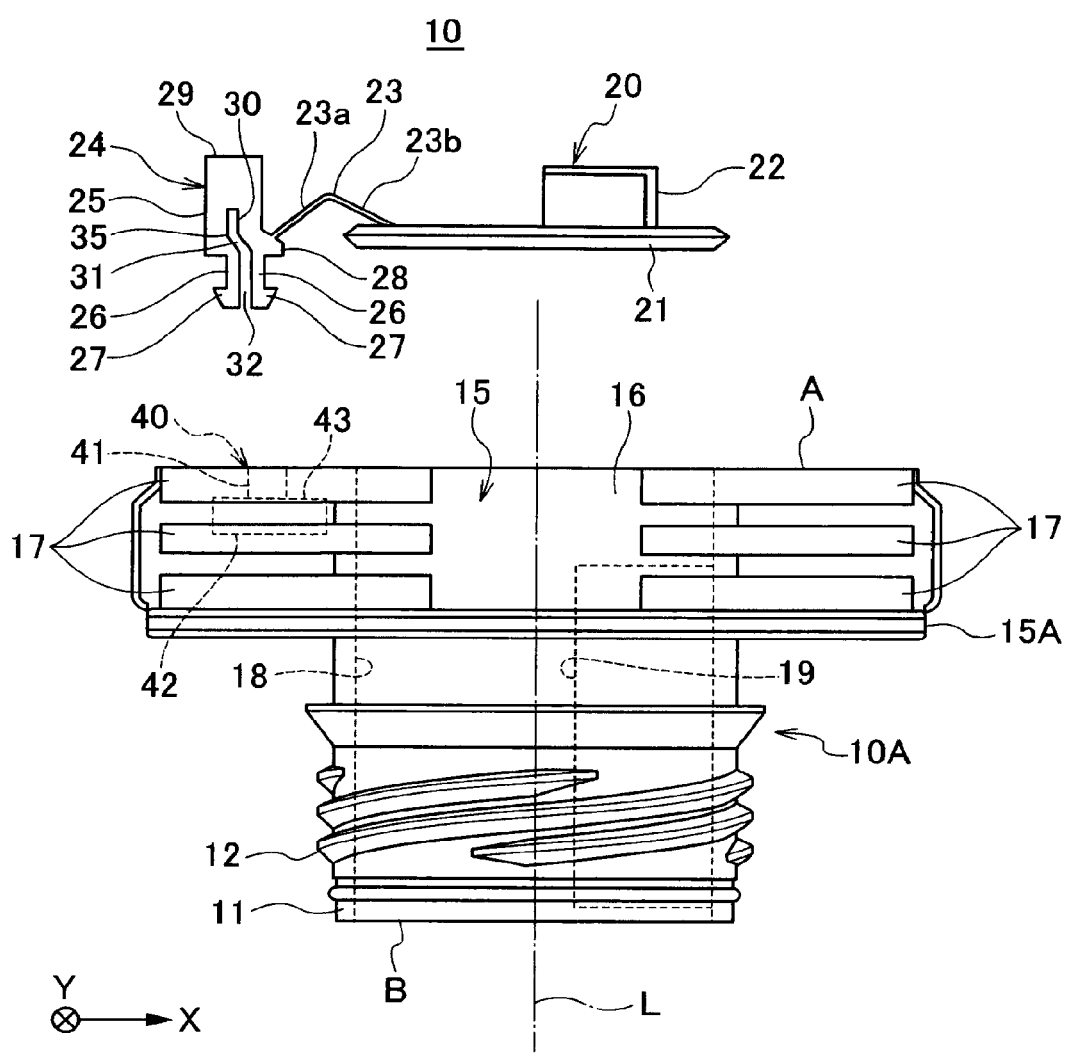
FIG. 2 is a side view illustrating the pouring spout according to the present invention with a spout main body and a closing unit separated from each other.
Figure 3:
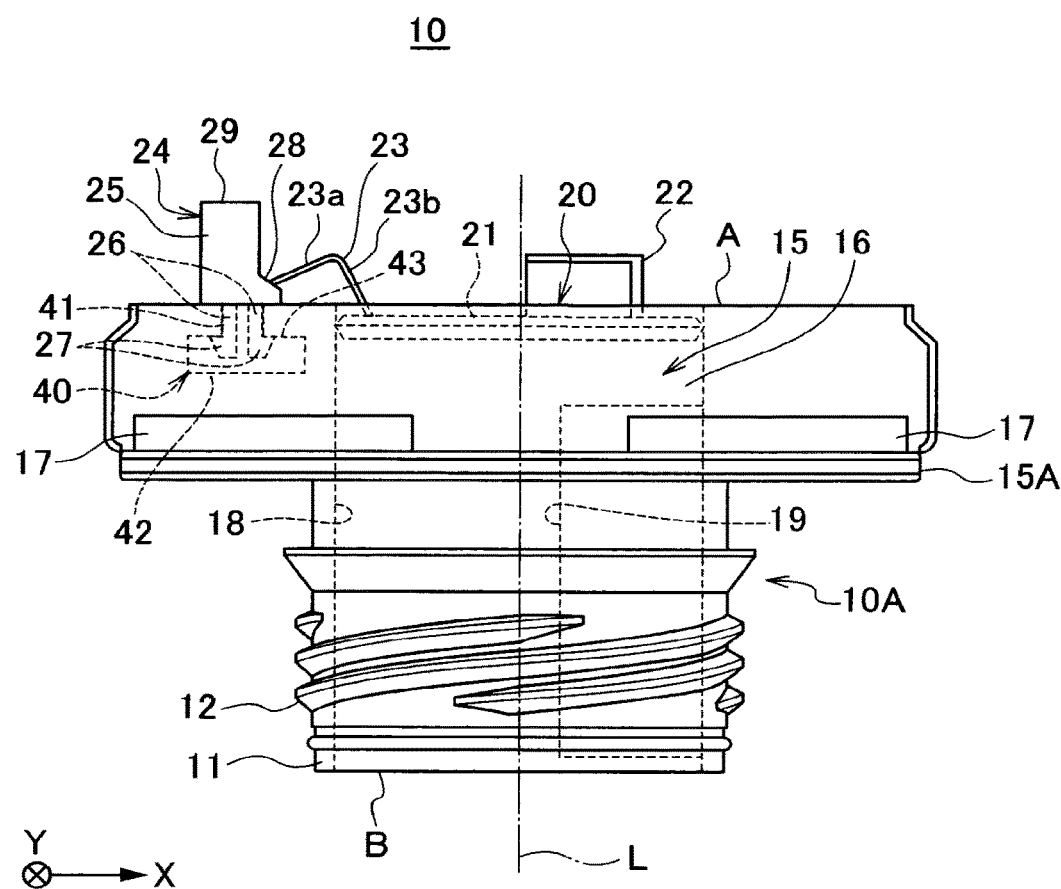
FIG. 3 is a side view illustrating the pouring spout according to the present invention with the spout main body and the closing unit integrated.
Figure 4:
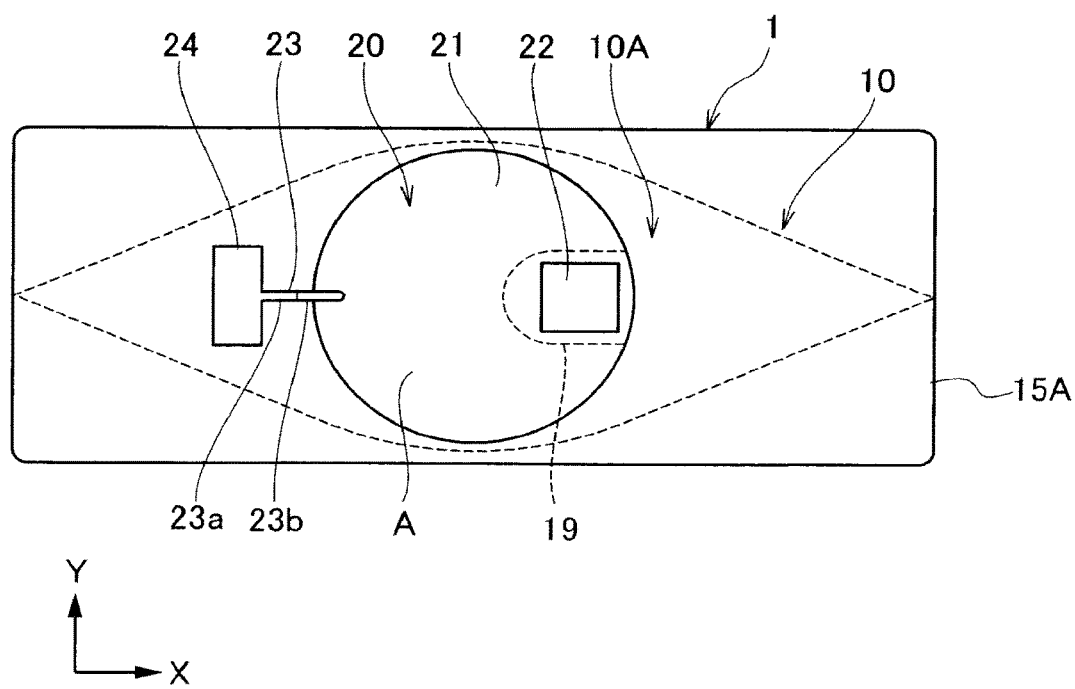
FIG. 4 is a plan view of the pouring spout according to the present invention as viewed from a second surface side.

The spout main body 10A, as illustrated in FIG. 2 to FIG. 4, includes at least the bonded part 15, the tubular part 11, and the channel 18. As illustrated in FIG. 4, a flange part 15A having a rectangular or substantially rectangular shape is provided at a position of a border between the bonded part 15 and the tubular part 11 in the spout main body 10A.

(Bonded Part)

The bonded part 15 is an area bonded to the refill container 1. This bonded part 15 has a boat-like outer shape. That is, in FIG. 2 to FIG. 4, both side surfaces of the bonded part 15 include a jutting part 16 that juts in a semicircular shape in the Y direction at the central portion in the X direction. In contrast, both end portions in the X direction taper toward both end sides, and both side surfaces are connected at both end portions in the X direction. Further, the bonded part 15 is formed with a plurality of projecting parts 17 extending in the X direction.

(Tubular Part)

The tubular part 11 functions as a spout for pouring the contents stored in an inside of the refill container 1. The tubular part 11 is formed into a cylindrical or substantially cylindrical shape. A thread 12 for screwing the cap 6 is formed on an outer circumference of the tubular part 11.

(Channel)

The channel 18 has a circular inner circumferential shape and, as illustrated by the broken lines in FIG. 2 and FIG. 3, passes through a first end portion A side positioned on an outer side of the tubular part 11, and a second end portion B that forms an inner side of the refill container 1 in the bonded part 15. Therefore, the channel 18 is configured to allow an inner side and an outer side of the refill container 1 to communicate. A groove for engaging an outer peripheral portion of the closing member 21 is formed in the second end portion B forming the inner side of the refill container 1 of the bonded part 15 in the channel 18. The channel 18 is closed by an outer peripheral portion of the closing member 21 being engaged with this groove.

A guide 19 is formed on an inner peripheral surface of the channel 18. The guide 19 guides the nozzle 58 constituting the pouring unit 55 of the packaging container 50 from a tip end of the tubular part 11 toward the back. The guide 19 projects from the inner peripheral surface of the channel 18 toward the center, and is formed so as to extend in the same direction as an extending direction L of the tubular part 11. A cross-sectional shape of the guide 19 is not particularly limited as long as the guide 19 can guide the nozzle 58.

(Attached Part)

The attached part 40 is formed on the pouch main body part 5 side of the refill container 1 at the bonded part 15. The attached part 40 is an area to which the attaching part 24 of the closing unit 20 is attached. The attached part 40 is a hole formed on an outer side of the channel 18. As illustrated in FIG. 2 and FIG. 3, the attached part 40 is constituted by a hole into which arms 26 constituting the attaching part 24 are inserted, and an engaging part jutting toward an inner side of this hole and engaging hooks 27 formed at tip ends of the arms 26. Hereinafter, the engaging part will be referred to as a first hole 41, and the hole into which the arms 26 are inserted will be referred to as a second hole 42. The attached part 40 is constituted by the first hole 41 having a small width and formed at a position of a certain depth from an end surface on the pouch main body part 5 side, and the second hole 42 having a large width and formed at the back of the first hole 41. A shoulder part 43 is provided at a boundary portion between the first hole 41 and the second hole 42. The shoulder part 43 is an area with which the hooks 27 provided to the attaching part 24 are engaged, as described in detail later.

The spout main body 10A mentioned above is a constituting part separate from the closing unit 20 described below and therefore, when the spout main body 10A is manufactured by injection molding or the like, a resin can be supplied to every corner of the mold in a short time and thus the spout main body 10A can be molded in a short time. Further, the spout main body 10A and the closing unit 20 of the pouring spout 10 are separate bodies, making it possible to supply resin to every corner of the mold and manufacture a high-quality spout main body 10A.

<Closing Unit>

The closing unit 20 is a constituent for closing and opening the channel 18 formed in the spout main body 10A. The closing unit 20 is constituted by the closing member 21, the attaching part 24, and the coupling member 23.

(Closing Member)

The closing member 21 is configured to be capable of opening and closing the channel 18 of the spout main body 10A. The closing member 21 is formed to have the same or substantially the same shape as the inner peripheral portion of the channel 18, and closes the channel 18 by being fit into the inner side of the channel 18, specifically, the groove. As illustrated in FIG. 2 and FIG. 3, the outer peripheral portion of the closing member 21 includes an intermediate portion in a thickness direction that projects outward in a radial direction compared to one surface side (second end portion B side) and the other surface side (first end portion A side), and thus be readily engaged with the groove formed in the channel 18. As mentioned above, a groove is formed in the inner circumference of the channel 18, and the closing member 21 closes the channel 18 by the outer peripheral portion of the closing member 21 being engaged with the groove of the channel 18. On the other hand, when an external force from the one surface side (second end portion B side) toward the other surface side (first end portion A side) is imparted onto the closing member 21 having closed the channel 18, the outer peripheral portion of the closing member 21 is removed from the groove of the channel 18. At that time, because the outer peripheral portion of the closing member 21 is formed in a tapered shape that tapers toward the outer side of the refill container 1, the closing member 21 is smoothly removed from the groove. As a result of the outer peripheral portion being removed from the groove, the closing member 21 is removed from the channel 18 and the channel 18 is opened.

A first protruding part 22 is formed on the other surface side (first end portion A side) of the closing member 21. Specifically, the first protruding part 22 is provided at a position that forms a diagonal to the attaching part 24 on the other surface side (first end portion A side) of the closing member 21. This first protruding part 22 is a constituting part provided as necessary. The first protruding part 22 is utilized when the closing unit 20 is supplied to the spout main body 10A, as described later, when the pouring spout 10 is manufactured.

(Attaching Part)

The attaching part 24 is a constituting part for attaching the closing unit 20 to the spout main body 10A. As illustrated in the upper area of FIG. 2, the attaching part 24 is constituted by a body part 25, a pair of the arms 26 extending downward from the body part 25, and a second protruding part 29 projecting upward from the body part 25. The second protruding part 29, similar to the first protruding part 22, is utilized when the pouring spout 10 is manufactured and the closing unit 20 is supplied to the spout main body 10A.

Slits 30, 31, 32 are formed in an inside of the body part 25. The slits 30, 31, 32 are constituted by the linear slit 30 having a linear shape and extending in a vertical direction of the attaching part 24, the inclined slit 31 formed obliquely toward the closing member 21 side below the linear slit 30, and the vertical slit 32 formed between the arms 26. A bent part 35 is formed in an area corresponding to the inclined slit 31, the inclined slit 31 is inclined with respect to the linear slit 30 at a position of this bent part 35, and a base side of the arms 26 is shifted toward the closing member side. A tip end of the inclined slit 31 extends to a lower end portion of the body part 25. On the other hand, a coupling member connecting part 28 projecting toward the closing member 21 side is formed on an outer peripheral portion of the body part 25. The coupling member 23 is integrally connected to the coupling member connecting part 28. The bases of the pair of arms 26 are provided at the lower end portion of the body part 25 at a predetermined interval with the inclined slit 31 interposed therebetween. The pair of arms 26 extend downward from the body part 25 at the same interval as a groove width of the inclined slit 31. An area formed between the pair of arms 26 at the same interval as the groove width of the inclined slit 31 is the vertical slit 32. The hooks 27 are provided at tip ends of the pair of arms 26, and each hook 27 projects from the arm 26 toward the opposite side. Each hook 27 has a tapered shape so that the tip end side of the arm 26 is tapered.

(Coupling Member)

The coupling member 23 is a constituting part that connects the closing member 21 and the attaching part 24, and has a string or belt shape. The coupling member 23 is integrally molded with the closing member 21 and the attaching part 24 when the closing unit 20 is manufactured by injection molding. At that time, one end of the coupling member 23 is connected to one surface side (second end portion B side) opposite to the other surface side (first end portion A side) facing the inner side of the refill container 1 in the closing member 21. Further, the other end of the coupling member 23 is connected to the attaching part 24. However, the closing member 21 and the attaching part 24 may be molded separately, and one end may be attached to the closing member 21 and the other end may be attached to the attaching part 24.

Such a coupling member 23 is constituted by a first constituting part 23a and a second constituting part 23b. The first constituting part 23a extends from the coupling member connecting part 41 toward the closing member 21, and the second constituting part 23b is bent with respect to the first constituting part 23a and extends from a tip end of the first constituting part 23a toward the first surface.

[Open Mode of Closing Member]

Figure 5:
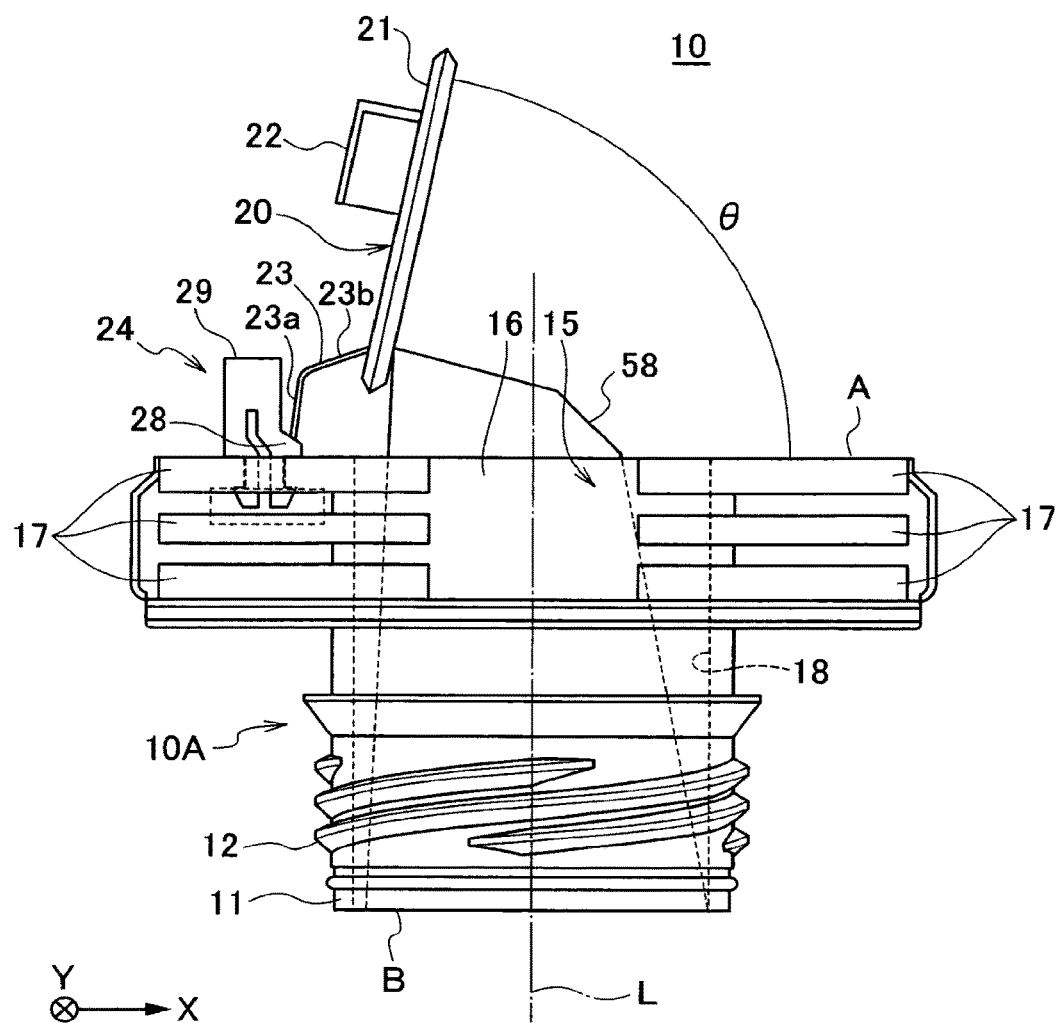
FIG. 5 is an explanatory view for explaining an open mode of the closing member in the pouring spout.

FIG. 5 illustrates the open mode of the closing member 21. In the open mode of the closing member 21, the attaching part 24 side of the closing member 21 is supported by the nozzle 58. Specifically, in the closing member 21, the second surface opposite to the first surface and corresponding to an area where the coupling member 23 is coupled to the closing member 21 is supported by the coupling member 23. The supported region is a fixed region corresponding to the area coupled to the closing member 21. The closing member 21 in the open mode is held in a mode in which an angle formed by the closing member 21 with an end surface of the bonded part 15 on the pouch main body part 5 side is less than 90 degrees.

A length of the coupling member 23 is restricted to a fixed length. Specifically, the coupling member 23 is formed at a length within a range in which the second surface can be brought into contact with an outer peripheral surface of the nozzle 58. Such a coupling member 23 has an urging force that urges the closing member 21 toward the nozzle 58 side. That is, when the closing member 21 is opened, the coupling member 23 resists an opening force of the closing member 21 and urges the closing member 21 in a closing direction. As a result, the closing member 21 is interposed between the nozzle 58 and the coupling member 23, and the open mode is stably maintained.

Examples of a configuration for imparting an urging force onto the coupling member 23 include the following. That is, the coupling member connecting part 28 is formed on the second protruding part 29. The coupling member connecting part 28 is formed on the second protruding part 29 of the attaching part 24. Specifically, the coupling member connecting part 28 is formed so as to jut from the second protruding part 29 toward the closing member 21 side. Then, the coupling member 23 is connected to the coupling member connecting part 28 at one end and connected to the first surface of the closing member 21 at the other end in the longitudinal direction.

The refill container 1 described above is used for pouring the contents into the packaging container 50 described below. A configuration of the packaging container 50 will be briefly described.

[Packaging Container]

Figure 6:
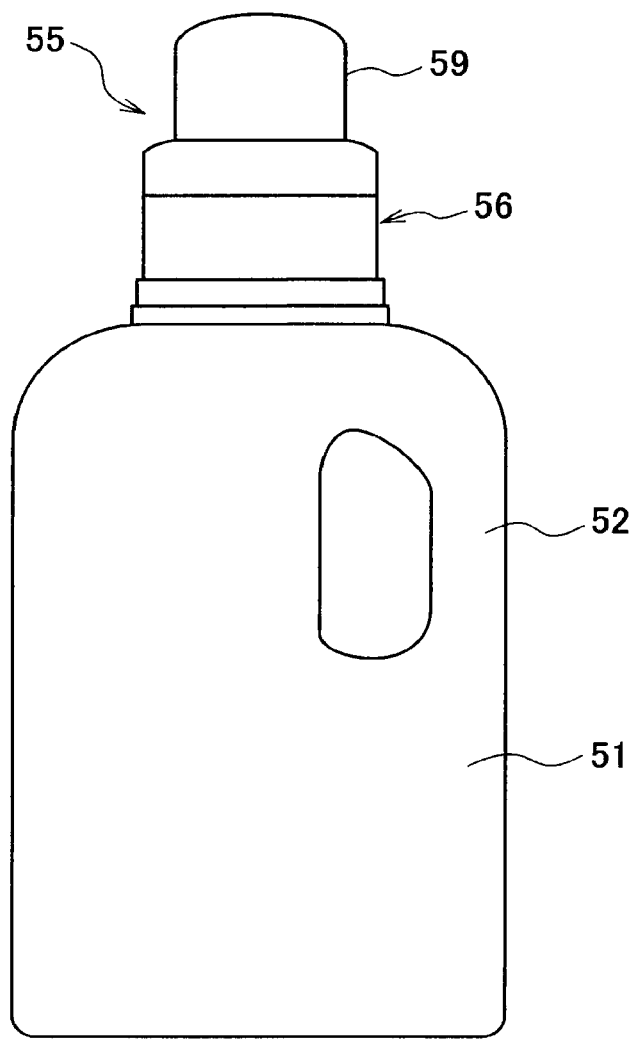
FIG. 6 is a side view illustrating an example of a packaging container.

The packaging container 50 is a container replenished with the contents stored in the refill container 1. The packaging container 50 is constituted by a resin or the like, for example. FIG. 6 illustrates an example of the packaging container 50. The packaging container 50 illustrated in FIG. 6 is constituted by the container main body 51 provided with a handle 52, and the pouring unit 55 for pouring out the contents stored in the container main body 51. This packaging container 50 is used by pouring from the packaging container 50 the contents moved from the refill container 1 in an amount required when necessary.

Figure 7:
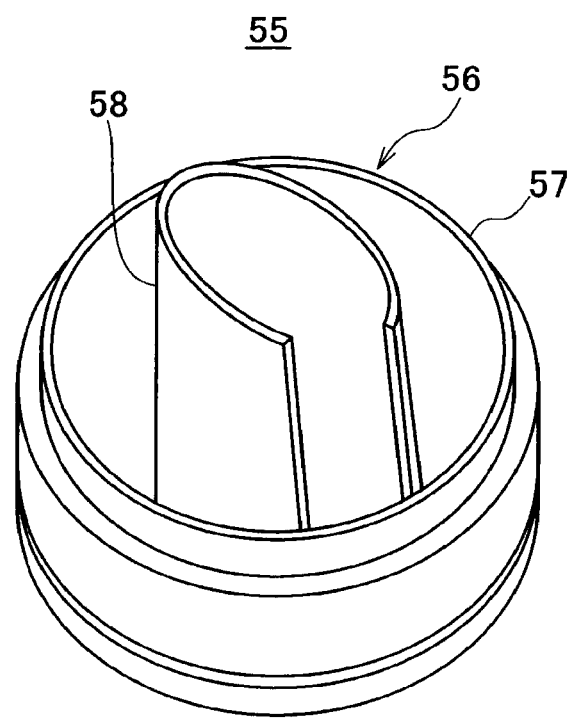
FIG. 7 is a perspective view of a pouring unit used in the packaging container.

The pouring unit 55 of the packaging container 50 is constituted by a main body part 56, and a cap 59 for opening and closing the main body part 56. The main body part 56, as illustrated in FIG. 7, includes a peripheral wall surface 57, and a nozzle 58 disposed on an inner side of the peripheral wall surface 57. The peripheral wall surface 57 has a tubular shape, and an inner side thereof is hollow.

The nozzle 58 is disposed in a central or substantially central position of the main body part 56. The nozzle 58 is connected to the peripheral wall surface 57 and integrated with the peripheral wall surface 57. The nozzle 58 is configured to project toward an upper side of the main body part 56, with a tip end thereof positioned on an upper side of an upper end of the peripheral wall surface 57. However, FIG. 7 illustrates one example of the shape of the nozzle 58, and the shape of the nozzle 58 is not particularly limited.

[Procedure for Replenishing Packaging Container with Contents of Refill Container and Action of Pouring Spout]

The procedure for replenishing the packaging container 50 with the contents stored in the refill container 1, and the action of the pouring spout 10 of the present embodiment will now be described with reference to FIG. 8. Note that, to make the action of the pouring unit 55 easy to understand, the pouch main body part 5 of the refill container 1 and the container main body 51 of the packaging container 50 are not illustrated in FIG. 8. However, the pouring spout 10 is attached to the refill container 1 illustrated in FIG. 1, and the pouring unit 55 is provided to the packaging container 50 illustrated in FIG. 8.

First, the cap 6 is removed from the pouring spout 10, the refill container 1 is turned upside down, and the pouring spout 10 is positioned on a lower side of the refill container 1. The channel 18 of the pouring spout 10 is closed by the closing member 21, and thus the contents stored in the refill container 1 never spill out. Further, in the pouring unit 55 of the packaging container 50, the cap 59 is removed in advance from the main body part 56.

Figure 8A:
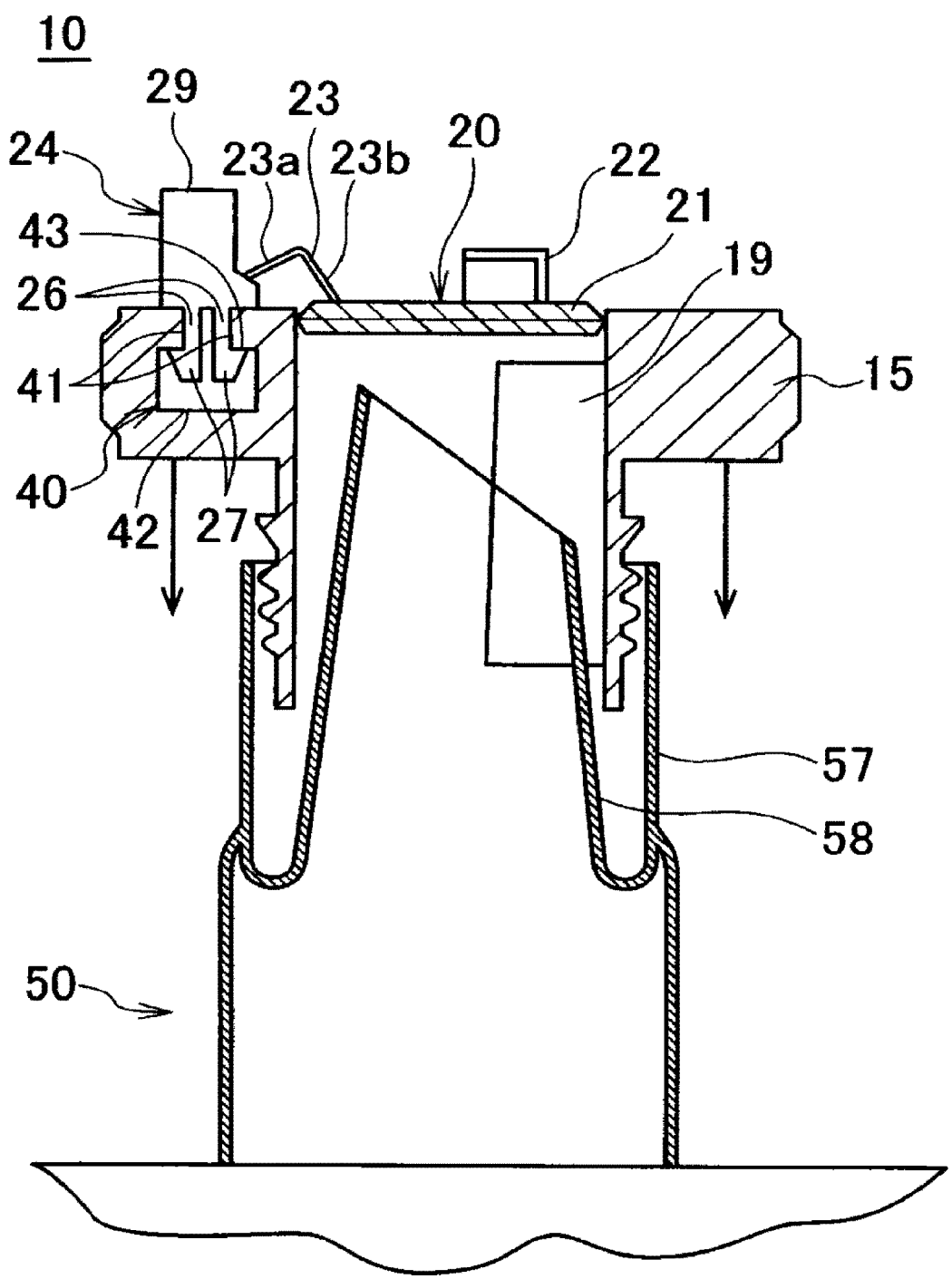
FIG. 8A and FIG. 8B are explanatory views for explaining an action of the pouring spout according to the present invention.

Next, as illustrated in FIG. 8A, the pouring spout 10 is matched with the position of the pouring unit 55 of the packaging container 50, the refill container 1 is pressed downward, and the nozzle 58 of the pouring unit 55 is inserted into the channel 18 of the pouring spout 10.

Figure 8B:
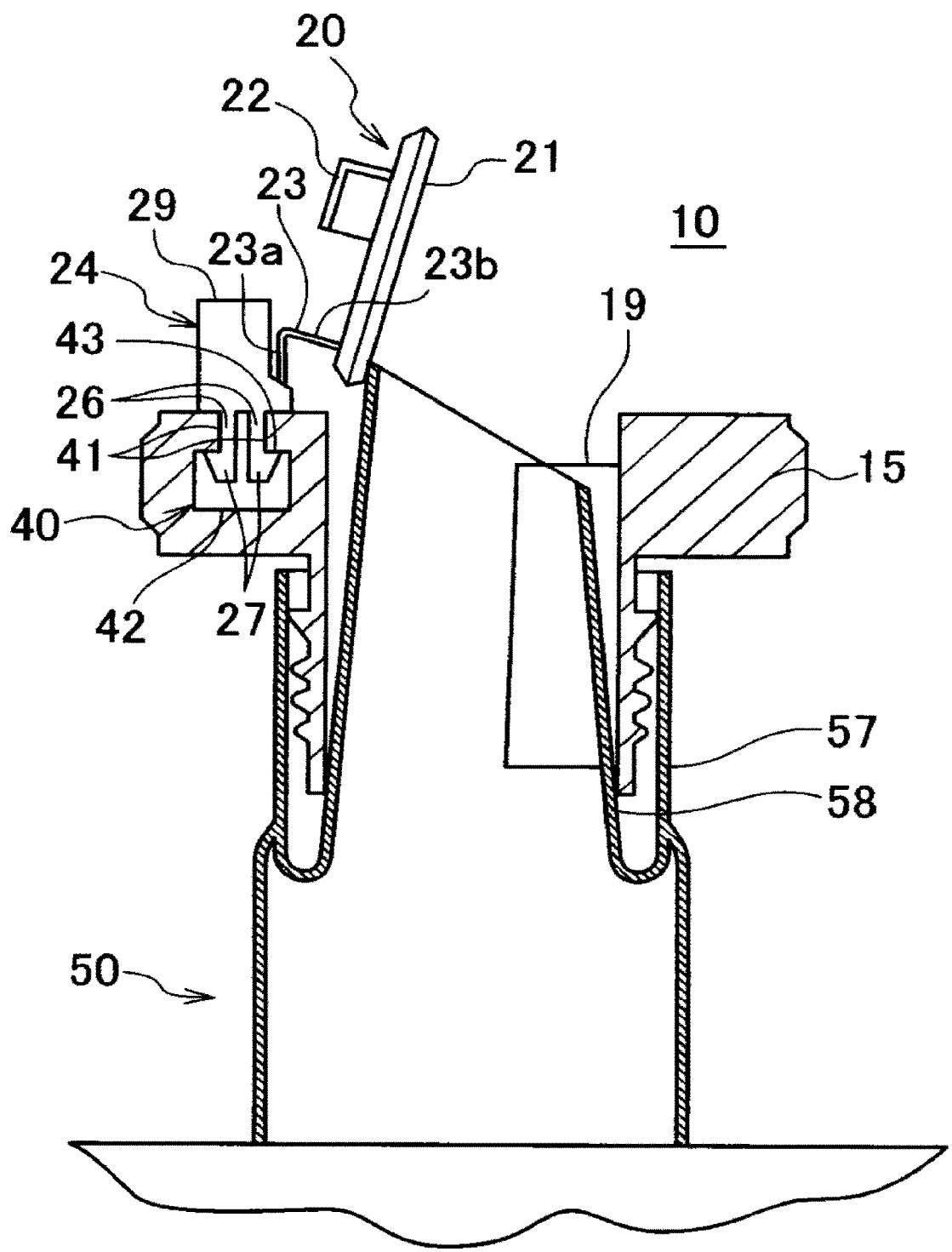

When the refill container 1 is pressed downward, the tip end of the nozzle 58 presses the closing member 21 upward. Therefore, as illustrated in FIG. 8B, the closing member 21 is removed from the channel 18. That is, the outer peripheral portion of the closing member 21 is removed from the groove formed in the inner peripheral surface of the channel 18 by an external force applied from the one surface side (second end portion B side) of the channel 18 in the extending direction L.

As illustrated in FIG. 8B, in the open mode of the closing member 21, the attaching part 24 side of the closing member 21 is supported by the tip end and the vicinity of the tip end of the nozzle 58. The coupling member 23 is formed at a length within a range in which the second surface of the closing member 21 can be brought into contact with the outer peripheral surface of the nozzle 58 in the open mode of the channel 18. Therefore, movement of the attaching part 24 side of the closing member 21 further toward the pouch main body part 5 side of the tip end of the nozzle 58 is suppressed, making it possible to avoid a state in which the closing member 21 is not supported by the nozzle 58. The closing member 21 in the open mode is held in a mode in which an angle formed by the closing member 21 and an end surface of the bonded part 15 on the pouch main body part side is less than 90 degrees.

Further, the closing member 21 is urged toward the nozzle 58 side by the coupling member 23. The coupling member 23 is constituted by the first constituting part 23a extending from the coupling member connecting part 28 toward the closing member 21, and the second constituting part 23b bent with respect to the first constituting part 23a and extending from the tip end of the first constituting part 23a toward the first surface. Further, the second protruding part 29 is formed on the attached part 40, and the coupling member connecting part 28 jutting toward the closing member 21 side is formed on the second protruding part 29. Then, the coupling member 23 is connected to the coupling member connecting part 28 at one end and connected to the first surface of the closing member 21 at the other end in the longitudinal direction.

With the coupling member 23 and the coupling member connecting part 28 configured as described above, the coupling member connecting part 28 imparts an urging force onto the bent coupling member 23 and presses the closing member 21 in the open mode against the nozzle 58. Therefore, as illustrated in FIG. 8B, the closing member 21 is held in the open mode.

DESCRIPTIONS OF REFERENCE NUMERALS

1 Refill container
2 Flat surface part
3 Bottom surface part
4 Crease
5 Pouch main body part
6 Cap
10 Pouring spout
10A Spout main body
11 Tubular part
12 Thread
15 Bonded part
15A Flange part
16 Jutting part
17 Projecting part
18 Channel
19 Guide
20 Closing unit
21 Closing member
22 First protruding part
23 Coupling member
23a First constituting part
23b Second constituting part 24 Attaching part
25 Body part
26 Arm
27 Hook
28 Coupling member connecting part
29 Second protruding part
30, 31, 32 Slit
30 Linear slit
31 Inclined slit
32 Vertical slit
35 Bent part
40 Attached part
41 First hole
42 Second hole
43 Shoulder part
50 Packaging container
51 Container main body
52 Handle
55 Pouring unit
56 Main body part
57 Peripheral wall surface
58 Nozzle
59 Cap

What is claimed is:

1. A pouring spout provided to a refill container and for pouring out contents stored in the refill container into a packaging container, the pouring spout comprising:
a spout main body; and
a closing unit,
the spout main body including at least a bonded part bonded to a pouch main body part constituting the refill container, a tubular part for pouring out the contents, and a channel for passing the contents from an inside to an outside of the refill container,
the closing unit including a closing member that freely opens and closes the channel, an attaching part that detachably attaches the closing unit to the spout main body, and a coupling member that connects the closing member and the attaching part,
the spout main body being formed with an attached part to which the attaching part is detachably attached,
the packaging container including a container main body and a pouring unit for pouring out the contents stored in the container main body,
the pouring unit including at least a nozzle for pouring out the contents,
the coupling member coupling a first surface of the closing member on the attaching part side and facing the pouch main body side in a mode of the closing member having closed the channel, and the attaching member, and
the closing member including a fixed region corresponding to an area of a second surface opposite to the first surface on the attaching part side thereof in which the coupling member is coupled to the closing member, the fixed region being supported by the nozzle, thereby holding an angle formed by the closing member with an end surface of the bonded part on the pouch main body part side at less than 90 degrees.

2. The pouring spout according to claim 1, wherein
in a mode of the closing member being pressed upward by the nozzle and having opened the channel, the coupling member is formed at a length within a range allowing the second surface to be brought into contact with an outer peripheral surface of the nozzle.

3. The pouring spout according to claim 1, wherein
the coupling member is constituted by a first constituting part extending from the coupling member connecting part toward the closing member, and a second constituting part bent with respect to the first constituting part and extending from a tip end of the first constituting part toward the first surface, and
the coupling member has an urging force that urges the closing member toward the nozzle side.

4. The pouring spout according to claim 1, wherein
the attached part is formed with a coupling member connecting part jutting toward the closing member side, and
the coupling member is connected to the coupling member connecting part at one end and connected to the first surface of the closing member at the other end in a longitudinal direction.

* * * * *